US011599739B2

(12) United States Patent
Hayashi et al.

(10) Patent No.: US 11,599,739 B2
(45) Date of Patent: Mar. 7, 2023

(54) IMAGE SUGGESTION APPARATUS, IMAGE SUGGESTION METHOD, AND IMAGE SUGGESTION PROGRAM

(71) Applicant: FUJIFILM Corporation, Tokyo (JP)

(72) Inventors: Shinji Hayashi, Tokyo (JP); Kazuyuki Itagaki, Tokyo (JP); Takatoshi Karino, Tokyo (JP); Makoto Ozeki, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 17/172,701

(22) Filed: Feb. 10, 2021

(65) Prior Publication Data

US 2021/0166067 A1    Jun. 3, 2021

Related U.S. Application Data

(63) Continuation of application No. PCT/JP2019/027384, filed on Jul. 10, 2019.

(30) Foreign Application Priority Data

Sep. 21, 2018  (JP) .............................. JP2018-177439

(51) Int. Cl.
*G06K 9/62*    (2022.01)
*G06F 3/01*    (2006.01)
(Continued)

(52) U.S. Cl.
CPC ............ *G06K 9/6215* (2013.01); *G06F 3/011* (2013.01); *G06F 16/54* (2019.01); *G06N 20/00* (2019.01);
(Continued)

(58) Field of Classification Search
CPC ...... G06K 9/6215; G06N 20/00; G06F 16/54; G06F 3/011; G06F 3/0482; G06V 10/75; G06V 10/40; G06V 10/751; G06T 11/00
See application file for complete search history.

(56) References Cited

U.S. PATENT DOCUMENTS 6,112,015 A * 8/2000 Planas .................... H04L 41/22
                                                      715/764
6,584,465 B1 * 6/2003 Zhu ........................ G06V 10/758
(Continued)

FOREIGN PATENT DOCUMENTS

JP    2004-318359 A    11/2004
JP    2006-244329 A     9/2006
(Continued)

OTHER PUBLICATIONS

International Search Report issued in PCT/JP2019/027384; dated Oct. 1, 2019.
(Continued)

*Primary Examiner* — Nicholas Augustine
(74) *Attorney, Agent, or Firm* — Studebaker & Brackett PC

(57) ABSTRACT

A data storage unit collects and stores, for each user, data related to a "room-and-image" combination preferred by the user. A generation unit generates information which indicates a "room-and-image" relationship and in which a preference of the user is reflected by using the data collected for each user. In a case where a room image (second image) captured by the user is acquired, an image selection unit selects an image (third image) in which the preference of the user is reflected, from an image group registered in a content DB or an image group registered in a user image DB, based on the acquired second image and the information which indicates the "room-and-image" relationship, and suggests the selected image to the user. Thereby, it is possible to suggest an image which matches with the user's room and in which the preference of the user is reflected, as an image for decorating the user's room.

20 Claims, 12 Drawing Sheets

(51) Int. Cl.
*G06N 20/00* (2019.01)
*G06F 16/54* (2019.01)
*G06T 11/00* (2006.01)
*G06V 10/40* (2022.01)
*G06V 10/75* (2022.01)
*G06F 3/0482* (2013.01)

(52) U.S. Cl.
CPC .............. *G06T 11/00* (2013.01); *G06V 10/40* (2022.01); *G06V 10/75* (2022.01); *G06V 10/751* (2022.01); *G06F 3/0482* (2013.01)

(56) References Cited

U.S. PATENT DOCUMENTS

| | | | | |
|---|---|---|---|---|
| 7,230,629 | B2* | 6/2007 | Reynolds | G06F 3/0482 345/589 |
| 10,699,488 | B1* | 6/2020 | Terrano | G06N 20/00 |
| 2001/0047250 | A1* | 11/2001 | Schuller | G06T 15/04 703/1 |
| 2003/0151611 | A1* | 8/2003 | Turpin | G06F 3/04845 345/589 |
| 2005/0100210 | A1* | 5/2005 | Rice | G06Q 30/02 382/162 |
| 2006/0204137 | A1 | 9/2006 | Shimoda et al. | |
| 2009/0089833 | A1 | 4/2009 | Saito et al. | |
| 2009/0231356 | A1* | 9/2009 | Barnes | G06Q 30/0275 715/781 |
| 2011/0018895 | A1* | 1/2011 | Buzyn | G06F 3/04845 345/473 |
| 2011/0018896 | A1* | 1/2011 | Buzyn | G06F 3/04845 715/810 |
| 2012/0170840 | A1* | 7/2012 | Caruso | G06F 3/048 382/165 |
| 2013/0342564 | A1* | 12/2013 | Kinnebrew | G09G 3/003 345/619 |
| 2014/0075361 | A1* | 3/2014 | Reynolds | G06Q 30/0603 715/771 |
| 2014/0108942 | A1* | 4/2014 | Freeman | G06F 16/00 715/738 |
| 2015/0242095 | A1* | 8/2015 | Sonnenberg | G06F 3/04842 715/810 |
| 2016/0171304 | A1* | 6/2016 | Golding | G01J 3/528 345/632 |
| 2016/0275702 | A1* | 9/2016 | Reynolds | G06T 7/12 |
| 2017/0038829 | A1* | 2/2017 | Lanier | G06T 19/006 |
| 2017/0038837 | A1* | 2/2017 | Faaborg | G06F 3/017 |
| 2017/0132694 | A1* | 5/2017 | Damy | G06F 3/0488 |
| 2017/0132822 | A1* | 5/2017 | Marschke | G06Q 30/0631 |
| 2018/0045963 | A1* | 2/2018 | Hoover | G06F 3/013 |
| 2018/0075658 | A1* | 3/2018 | Lanier | G06T 11/001 |
| 2018/0181199 | A1* | 6/2018 | Harvey | G06F 3/014 |
| 2018/0300023 | A1* | 10/2018 | Hein | G06Q 10/06 |
| 2018/0348861 | A1* | 12/2018 | Uscinski | G06F 3/011 |

FOREIGN PATENT DOCUMENTS

| | | |
|---|---|---|
| JP | 2009-134671 A | 6/2009 |
| JP | 2011-134253 A | 7/2011 |

OTHER PUBLICATIONS

International Preliminary Report on Patentability and Written Opinion issued in PCT/JP2019/027384; dated Mar. 23, 2021.

* cited by examiner

IMAGE SUGGESTION APPARATUS, IMAGE SUGGESTION METHOD, AND IMAGE SUGGESTION PROGRAM

CROSS-REFERENCE TO RELATED APPLICATIONS

This application is a Continuation of PCT International Application No. PCT/JP2019/027384 filed on Jul. 10, 2019, which claims priority under 35 U.S.C § 119(a) to Japanese Patent Application No. 2018-177439 filed on Sep. 21, 2018. Each of the above application(s) is hereby expressly incorporated by reference, in its entirety, into the present application.

BACKGROUND OF THE INVENTION

1. Field of the Invention

The present invention relates to an image suggestion apparatus, an image suggestion method, and an image suggestion program, and particularly relates to a technique of suggesting an image suitable for decorating a room to a user.

2. Description of the Related Art

In a case where a user selects an image to be used for an image print for decorating his/her room, the user needs to select an image which matches with an atmosphere of the room. However, there is a problem that it is difficult to select an image in which a preference of the user is reflected from a large number of image groups within a realistic time.

JP2009-134671A discloses an information processing terminal that acquires user's biometric information for each content while the user plays a video or an audio of the content using a television receiver and recommends the content highly evaluated from the biometric information to the user.

Further, JP2004-318359A discloses a product sales apparatus that allows a user to confirm an atmosphere or a harmony in a case where a product to be purchased is disposed in an actual room or allows a user to purchase a product while confirming whether or not the product fits a size of the room.

The product sales apparatus described in JP2004-318359A combines a product image obtained by capturing a product and a room image obtained by capturing a user's room, and outputs, as a guide, the combined image to a customer. In particular, in a case of combining the product image and the room image, the product sales apparatus adjusts sizes of the images according to a ratio between a size of the product and a size of the room in which the product is to be disposed, and adjusts a direction of the product image to a capturing direction of the room image by rotating the product image according to the capturing direction in which the room is captured. Thereby, the product image and the room image are combined with each other, and the product image is disposed in the room image.

Therefore, the user can purchase a product while confirming an atmosphere or a harmony in a case where the product to be purchased is disposed in an actual room or confirming whether or not the product fits a size of the room.

SUMMARY OF THE INVENTION

The invention described in JP2009-134671A recognizes a content highly evaluated by the user based on the user's biometric information and recommends the content to the user. However, the invention does not recommend an image which matches with the user's room.

On the other hand, the invention described in JP2004-318359A suggests a product suitable for a room (suitable for a size of a room) by acquiring a user's room image and combining the room image and a product image. However, the invention does not suggest an image which matches with the user's room and in which a preference of the user is reflected.

The present invention has been made in view of such circumstances, and an object of the present invention is to provide an image suggestion apparatus, an image suggestion method, and an image suggestion program capable of suggesting an image which matches with a user's room and in which a preference of the user is reflected to the user.

In order to achieve the above object, according to an aspect of the present invention, there is provided an image suggestion apparatus including: a data storage unit that collects and stores data which is collected for each user and is related to a combination of a first room and a first image, the data being related to the combination preferred by the user; a generation unit that generates information which indicates a relationship between the first room and the first image and in which a preference of the user is reflected by using the data stored in the data storage unit and corresponding to the user; an image acquisition unit that acquires a second image which is a second room image captured by the user; an image selection unit that selects a third image which is an image in which the preference of the user is reflected, from a registered image group or an image group owned by the user, based on the second image acquired by the image acquisition unit and the information which indicates the relationship and is generated by the generation unit; and a suggestion unit that suggests, as an image corresponding to an image print for decorating the second room of the user, the third image selected by the image selection unit to the user.

According to the aspect of the present invention, the data related to the "room-and-image" combination preferred by the user is collected, and the information which indicates the "room-and-image" relationship in which the preference of the user is reflected is generated by using the collected data. Further, in a case where a room image (second image) captured by the user is acquired, an image (third image) in which the preference of the user is reflected is selected, from the registered image group or the image group owned by the user, based on the acquired second image and the information which indicates the "room-and-image" relationship, and the selected image is suggested to the user. Thereby, it is possible to suggest an image which matches with the user's room and in which the preference of the user is reflected, as an image for decorating the user's room.

According to another aspect of the present invention, the image suggestion apparatus further includes: a biometric information acquisition unit that acquires biometric information of the user; and an image browsing unit that allows the user to browse an image. In the image suggestion apparatus, while the user is browsing an image by using the image browsing unit, in a case where a fourth image, which is an image of the first room decorated with the first image, appears on the image browsing unit, preferably, the data storage unit acquires the fourth image in which the preference of the user is reflected based on the biometric information of the user that is acquired from the biometric information acquisition unit, and collects data related to the combination preferred by the user from the acquired fourth image. Thereby, it possible to automatically collect the information related to the "room-and-image" combination preferred by the user.

According to still another aspect of the present invention, in the image suggestion apparatus, preferably, the biometric information acquisition unit is a wearable terminal worn by the user, the image browsing unit is a mobile terminal that acquires an image to be browsed via a network, displays the acquired image on a display unit, and acquires the biometric information of the user by performing communication with the wearable terminal, and the data storage unit acquires the fourth image in which the preference of the user is reflected from the mobile terminal.

According to still another aspect of the present invention, preferably, the image suggestion apparatus further includes: an image generation unit that generates a fifth image which matches with the second room based on the second image and the information which indicates the relationship and is generated by the generation unit. Preferably, the image selection unit selects, as the third image, one or a plurality of images similar to the generated fifth image from the registered image group or the image group owned by the user.

According to still another aspect of the present invention, in the image suggestion apparatus, preferably, the image selection unit extracts a feature amount indicating a feature of the fifth image which matches with the second room based on the second image and the information which indicates the relationship and is generated by the generation unit, and selects, as the third image, one or a plurality of images having a feature amount similar to the extracted feature amount from the registered image group or the image group owned by the user.

According to still another aspect of the present invention, in the image suggestion apparatus, preferably, the generation unit is a recognizer that performs machine learning using, as learning data, data which is stored in the data storage unit and corresponds to the user, and the image selection unit inputs, as an input image of the recognizer, the second image acquired by the image acquisition unit, and selects, based on a recognition result output from the recognizer, as the third image, one or a plurality of images similar to the recognition result from the registered image group or the image group owned by the user.

According to still another aspect of the present invention, in the image suggestion apparatus, preferably, the image selection unit extracts a feature amount indicating a feature of the recognition result output from the recognizer, and selects, as the third image, one or a plurality of images having a feature amount similar to the extracted feature amount from the registered image group or the image group owned by the user.

According to still another aspect of the present invention, in the image suggestion apparatus, preferably, the generation unit generates the information which indicates the relationship between the first room and the first image and in which the preference of the user is reflected by using, as the data corresponding to the user, data of a second user with an attribute similar to an attribute of the first user, among the data stored in the data storage unit.

According to still another aspect of the present invention, in the image suggestion apparatus, preferably, the suggestion unit suggests a plurality of the high-rank third images in which the preference of the user is reflected.

According to still another aspect of the present invention, in the image suggestion apparatus, preferably, the suggestion unit combines the selected third image with a wall region of the second image acquired by the image acquisition unit, and presents the combined fifth image to the user.

Further, according to still another aspect of the present invention, there is provided an image suggestion method including: collecting and storing data, which is collected for each user and is related to a combination of a first room and a first image, in a data storage unit, the data being related to the combination preferred by the user; generating information which indicates a relationship between the first room and the first image and in which a preference of the user is reflected by using the data stored in the data storage unit and corresponding to the user; acquiring a second image which is a second room image captured by the user; selecting a third image which is an image in which the preference of the user is reflected, from a registered image group or an image group owned by the user, based on the acquired second image and the generated information which indicates the relationship; and suggesting, as an image corresponding to an image print for decorating the second room of the user, the selected third image to the user.

Further, according to still another aspect of the present invention, there is provided an image suggestion program causing a computer to realize: a function of collecting and storing data, which is collected for each user and is related to a combination of a first room and a first image, in a data storage unit, the data being related to the combination preferred by the user; a function of generating information which indicates a relationship between the first room and the first image and in which a preference of the user is reflected by using the data stored in the data storage unit and corresponding to the user; a function of acquiring a second image which is a second room image captured by the user; a function of selecting a third image which is an image in which the preference of the user is reflected, from a registered image group or an image group owned by the user, based on the acquired second image and the generated information which indicates the relationship; and a function of suggesting, as an image corresponding to an image print for decorating the second room of the user, the selected third image to the user.

According to the present invention, it is possible to suggest, as an image for decorating the user's room, the image which matches with the user's room and in which the preference of the user is reflected, to the user.

DESCRIPTION OF THE PREFERRED EMBODIMENTS

Hereinafter, preferred embodiments of an image suggestion apparatus, an image suggestion method, and an image suggestion program according to an aspect of the present invention will be described with reference to the accompanying drawings.

[Configuration of Image Suggestion Apparatus]

Figure 1:
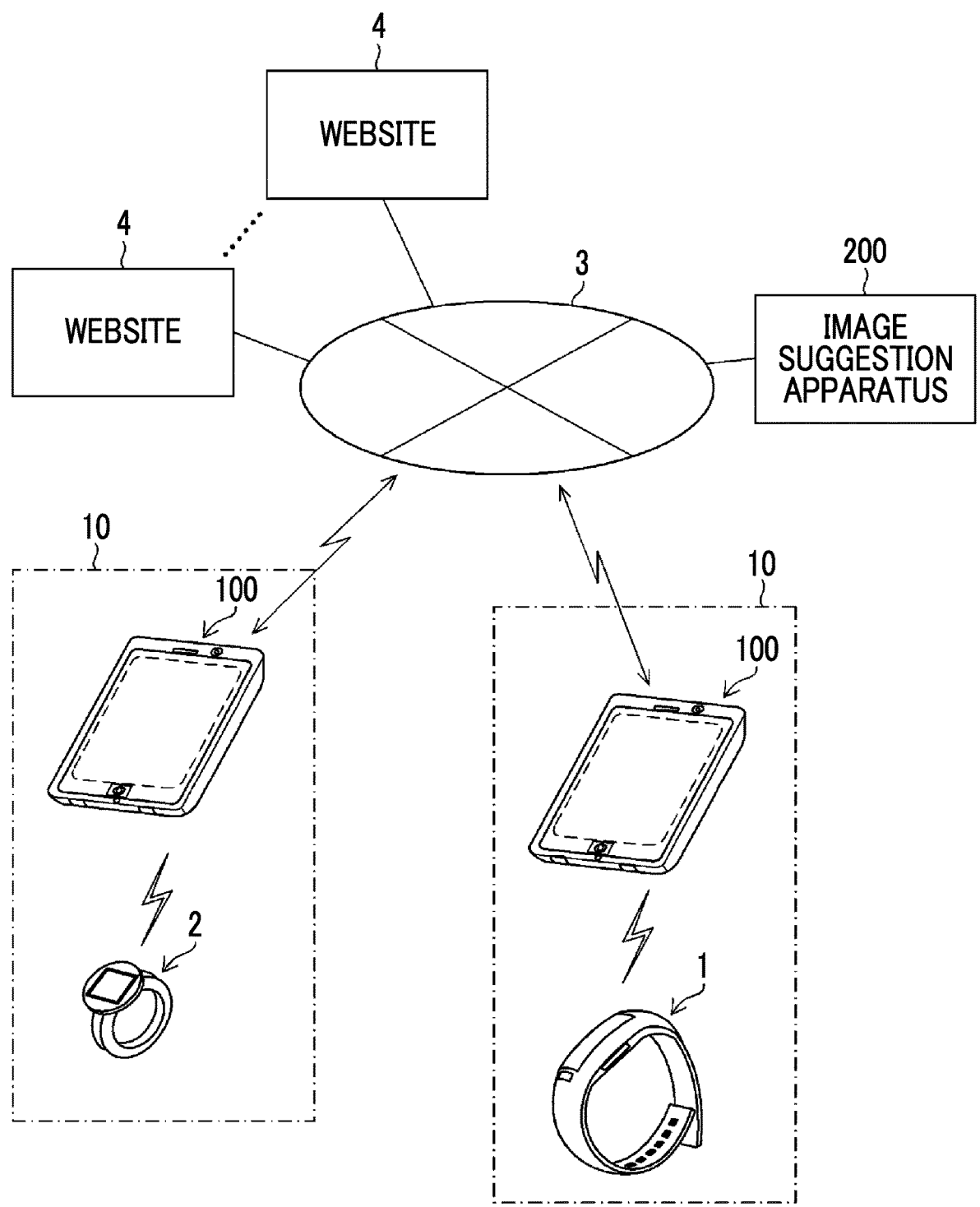
FIG. 1 is a system configuration diagram illustrating a system including an image suggestion apparatus according to an aspect of the present invention.

FIG. 1 is a system configuration diagram illustrating a system including an image suggestion apparatus according to an aspect of the present invention.

The system illustrated in FIG. 1 includes a user terminal 10 for each user and an image suggestion apparatus 200, and each user terminal 10 and the image suggestion apparatus 200 can communicate with each other via a network (Internet) 3.

Each website 4 connected to the network 3 provides contents such as images on a web page, and the contents can be browsed and used by a web browser of the user terminal 10. Each website 4 may be an existing website or may include a website created for a service provided by the image suggestion apparatus 200 to be described.

The user terminal 10 functions as an image browsing unit that allows a user to browse the contents (in this example, images) provided by the website 4 via the network 3, and has a function of acquiring biometric information of the user by communication (for example, short-range wireless communication) with wearable terminals 1 and 2 worn by the user. Particularly, the user terminal 10 functions as a data acquisition unit that acquires "room-and-image combination" data preferred by the user. Here, the "room-and-image combination" data indicates a combination of a room (including a living room, a dining room, a bedroom, a study room, an entrance, and the like) and an image (a photo) for decorating the room (a wall of the room), is data related to "room-and-image combination" preferred by the user, and includes, for example, image data of a room decorated with a photo. Here, the "room" refers to a space surrounded by at least a floor, a ceiling, and one or more walls. The room mainly refers to a space surrounded by a floor, a ceiling, and four sides. On the other hand, the room may include an open space such as a garage in which any one of four sides is absent.

The user terminal 10 includes a wristband-type wearable terminal 1 or a ring-type wearable terminal 2 including a built-in biometric information sensor for measuring biometric information, and a mobile terminal (in this example, a smartphone 100 that communicates with the wearable terminals 1 and 2 and is used by an owner of the wearable terminals 1 and 2.

The wearable terminals 1 and 2 include a built-in heart rate sensor, a built-in thermometer, and a built-in acceleration sensor that function as biometric information sensors. The wearable terminals 1 and 2 measure a heart rate, a body temperature, and acceleration by the sensors, and calculate (analyze) an exercise state, a body posture, a consumed calorie, the number of steps, a sleep time, and a mental state (relaxation, stress, excitement, or the like) based on the measurement results. The biometric information (including the analysis result) measured by the wearable terminal 1 is stored and managed in an internal memory of the wearable terminal 1, or may be displayed on a monitor.

Further, the wearable terminals 1 and 2 can exchange various information including the biometric information with the smartphone 100 by cooperating with the smartphone 100 in which application software corresponding to the wearable terminals 1 and 2 is installed.

In the smartphone 100, application software corresponding to the wearable terminals 1 and 2 is installed. In a case where the application software is executed, the smartphone 100 acquires biometric information from the wearable terminals 1 and 2, stores and manages the acquired biometric information, and outputs the biometric information to a monitor for confirmation by communicating with the wearable terminals 1 and 2.

The wearable terminal that acquires biometric information is not limited to the wristband-type wearable terminal 1 and the ring-type wearable terminal 2, and various wearable terminals such as an eyeglass-type wearable terminal, a clothing-type wearable terminal, a pendant-type wearable terminal, and a helmet-type wearable terminal may be used.

In a case of an eyeglass-type wearable terminal, the eyeglass-type wearable terminal includes an image capturing unit, a display, an acceleration sensor, a brainwave sensor, an electrooculogram sensor, and the like, and has a function of measuring biometric information such as a brainwave, a blink, an eye direction, an eye movement, and a body movement. The eyeglass-type wearable terminal can display measurement data and required information on a display provided in the eyeglasses.

Figure 2:
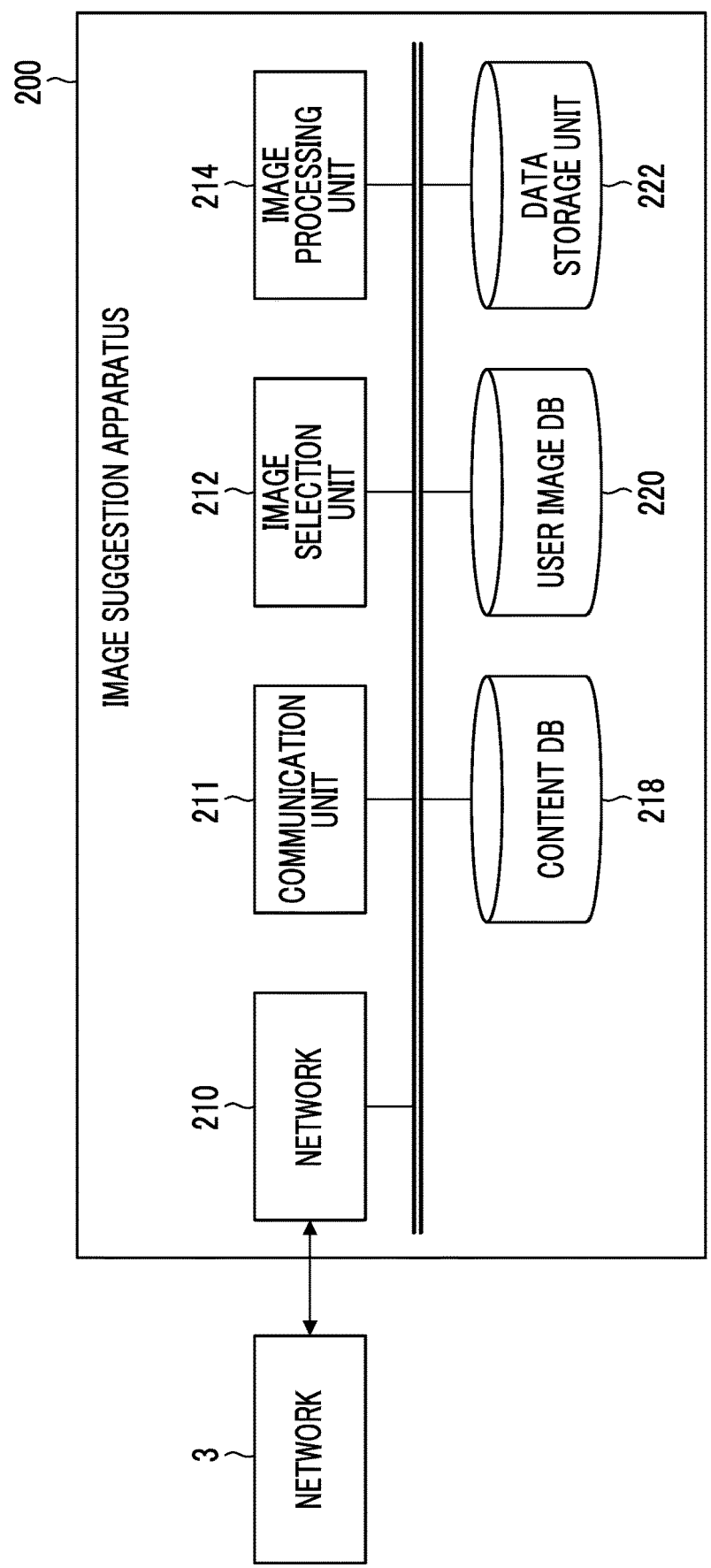
FIG. 2 is a block diagram illustrating an embodiment of the image suggestion apparatus 200 according to an aspect of the present invention.

FIG. 2 is a block diagram illustrating an embodiment of the image suggestion apparatus 200 according to an aspect of the present invention.

The image suggestion apparatus 200 illustrated in FIG. 2 functions as, for example, a server for the smartphone 100 corresponding to the user terminal 10, and mainly includes a communication unit 210, a generation unit 211 that generates information indicating a relationship between the room and the image ("room-and-image" relationship information), an image selection unit 212, an image processing unit 214, a content database (DB) 218, a user image DB 220, and a data storage unit 222.

As a hardware structure for executing various controls of the image suggestion apparatus 200, the following various computer processors may be used. The various processors include a central processing unit (CPU), which is a general-purpose processor that functions as various control units by executing software (program (including an image suggestion program)), and a dedicated electric circuit, which is a processor having a circuit configuration specifically designed to execute specific processing, such as a programmable logic device (PLD) or an application specific integrated circuit (ASIC) that is a processor of which the circuit configuration may be changed after manufacturing such as a field programmable gate array (FPGA).

One processing unit may be configured by one of these various processors, or may be configured by a combination of two or more processors having the same type or different types (for example, a combination of a plurality of FPGAs or a combination of a CPU and an FPGA). Further, the plurality of control units may be configured by one processor. As an example in which the plurality of control units are configured by one processor, firstly, as represented by a computer such as a client and a server, a form in which one processor is configured by a combination of one or more CPUs and software and the processor functions as the plurality of control units may be adopted. Secondly, as represented by a system on chip (SoC) or the like, a form in which a processor that realizes the function of the entire system including the plurality of control units by one integrated circuit (IC) chip is used may be adopted. As described above, the various control units are configured by using one or more various processors as a hardware structure.

The communication unit 210 is a unit that transmits and receives required information to and from a user terminal with a camera (in this example, the smartphone 100) via the network 3.

The communication unit 210 receives the "room-and-image combination" data acquired by the smartphone 100. The received "room-and-image combination" data is stored in the data storage unit 222 for each user. Details of a method of acquiring the "room-and-image combination" data by the smartphone 100 will be described later.

The data storage unit 222 stores, for each user, the "room-and-image combination" data which is collected for each user by the smartphone 100.

Figure 3:
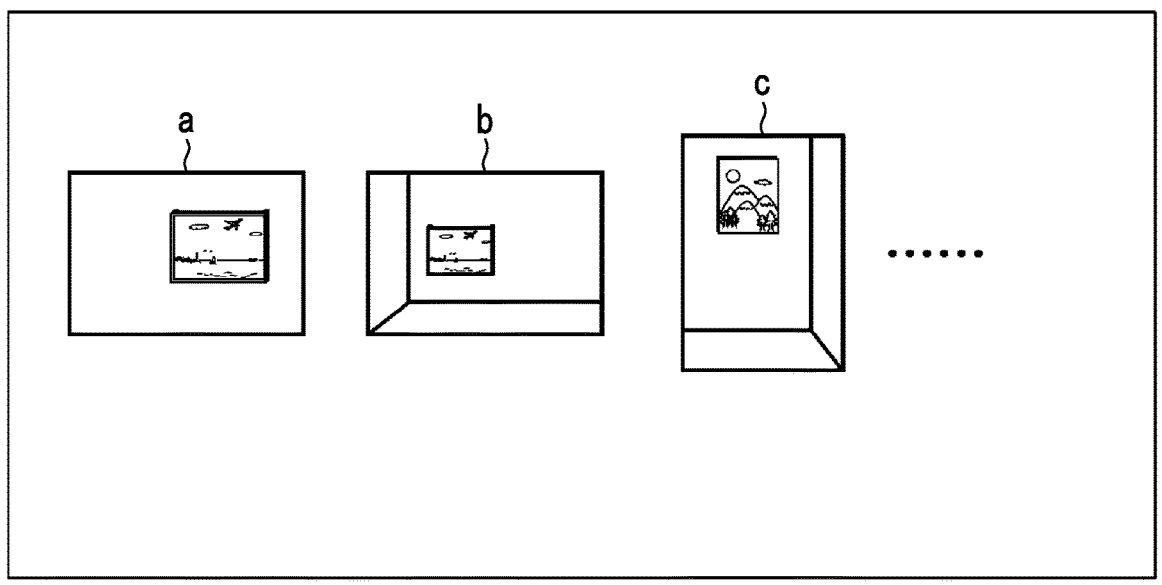
FIG. 3 is an example of "room-and-image combination" data stored in a data storage unit 222.

FIG. 3 is an example of the "room-and-image combination" data stored in the data storage unit 222. In this example, each of pieces of "room-and-image combination" data a, b, c, . . . is an image (fourth image) of a room (first room) decorated with a photo (first image), and is a room image that is acquired from the website 4 by the smartphone 100 while the user is browsing the website 4.

Further, the communication unit 210 functions as an image acquisition unit that acquires (receives) a second image, which is a user's room (second room) image captured by the smartphone 100.

Figure 4:
FIG. 4 is a diagram illustrating an example of a user's room image 230.

FIG. 4 is a diagram illustrating an example of a user's room image 230. The image 230 may be a still image or a moving image obtained by capturing a room to be decorated with an image print. In a case where the image 230 is a moving image, in a later step, the moving image may be divided into a plurality of still images that do not overlap each other (or slightly overlap with each other) by a known method, and images of the plurality of still images may be treated as an input image.

Further, the communication unit 210 transmits, to the smartphone 100, an image (third image) corresponding to an image print for decorating the user's room so as to suggest the image to the user.

Returning to FIG. 2, a large number of images (image groups) for image printing, which are for decorating a room (a wall of a room), are registered in advance in the content DB 218. The image group registered in the content DB 218 is, for example, an image group obtained by capturing images by a professional photographer.

In the user image DB 220, an image group obtained by capturing by each user and owned by each user is registered and managed for each user. An image group owned by a user may be registered in the user image DB 220 from the smartphone 100 via the communication unit 210. Further, an image group stored in a memory card (recording medium) owned by a user may be read and registered by a card reader or the like. The image group owned by a user may include an image which is captured by a person other than the user and is transmitted to the user, and an image which is stored on the Internet and can be accessed by the user at any time.

The content DB 218 and the user image DB 220 are not limited to DBs that are built in the image suggestion apparatus 200, and may be DBs that are connected by a local area network (LAN) or the like and can be accessed as appropriate.

The generation unit 211 is a unit that generates the "room-and-image" relationship information in which a preference of the user is reflected by using the data which corresponds to the user and is stored in the data storage unit 222.

The image selection unit 212 selects an image (third image) in which the preference of the user is reflected, from the image group which is registered in the content DB 218 or the image group which is registered in the user image DB 220 and is owned by the user, based on the user's room image 230 (FIG. 4) which is acquired via the communication unit 210 and the "room-and-image" relationship information which is generated by the generation unit 211. The third image may be one image or a plurality of images.

Details of the generation unit 211 and the image selection unit 212 will be described later.

The image processing unit 214 and the communication unit 210 function as a suggestion unit that suggests the third image selected by the image selection unit 212, as the image (third image) corresponding to the image print for decorating the user's room. The image processing unit 214 is a unit that processes the third image selected by the image selection unit 212, and generates an image (display image), which includes the third image and is to be displayed on a display unit of the smartphone 100, from the selected third image. The communication unit 210 transmits the display image generated by the image processing unit 214 to the smartphone 100.

<Collection of "Room-and-Image Combination" Data>

Figure 5:
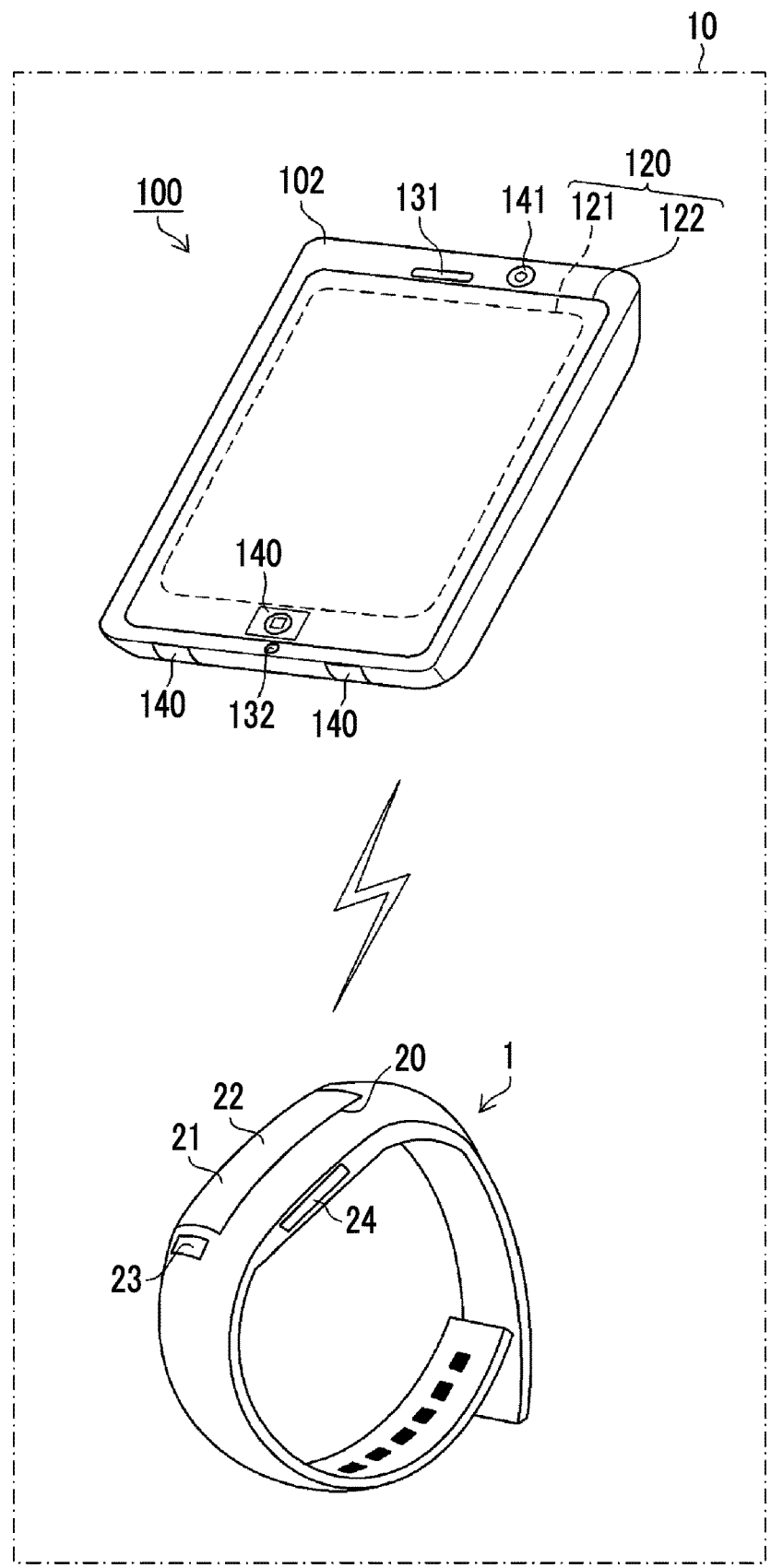
FIG. 5 is a diagram illustrating an appearance of a user terminal 10 illustrated in FIG. 1.

FIG. 5 is a diagram illustrating an appearance of the user terminal 10 illustrated in FIG. 1.

The user terminal 10 illustrated in FIG. 5 includes a wearable terminal 1 and a smartphone 100.

In a case where application software corresponding to the wearable terminal 1 is activated, the smartphone 100 acquires, from the wearable terminal 1, the biometric information measured and analyzed by the wearable terminal 1 by wireless communication.

Further, when the user browses the content provided by the website 4, in a case where a "room-and-image combination" image appears, the smartphone 100 detects the "room-and-image combination" image by using a program (a program for acquiring "room-and-image combination" data) that always operates in the smartphone 100. At that time, in a case where an emotion such as joy, anger, grief, or pleasure (user's emotion that is highly correlated with the user's biometric information) obtained by analyzing the biometric information acquired from the wearable terminal 1 changes in a positive direction, a browsed image (+biometric information) at that time is acquired as "room-and-image combination" data (+biometric information) preferred by the user.

[Smartphone 100]

The smartphone 100 illustrated in FIG. 5 includes a flat plate housing 102, a display panel 121 as a display unit that is provided on one surface of the housing 102, and a display input unit 120 in which an operation panel 122 as an input unit is integrated. Further, the housing 102 includes a speaker 131, a microphone 132, an operation unit 140, and a camera unit 141. The configuration of the housing 102 is not limited thereto, and for example, a configuration in which the display unit and the input unit are independently provided may be adopted, or a configuration including a folding structure or a sliding mechanism may also be adopted.

Figure 6:
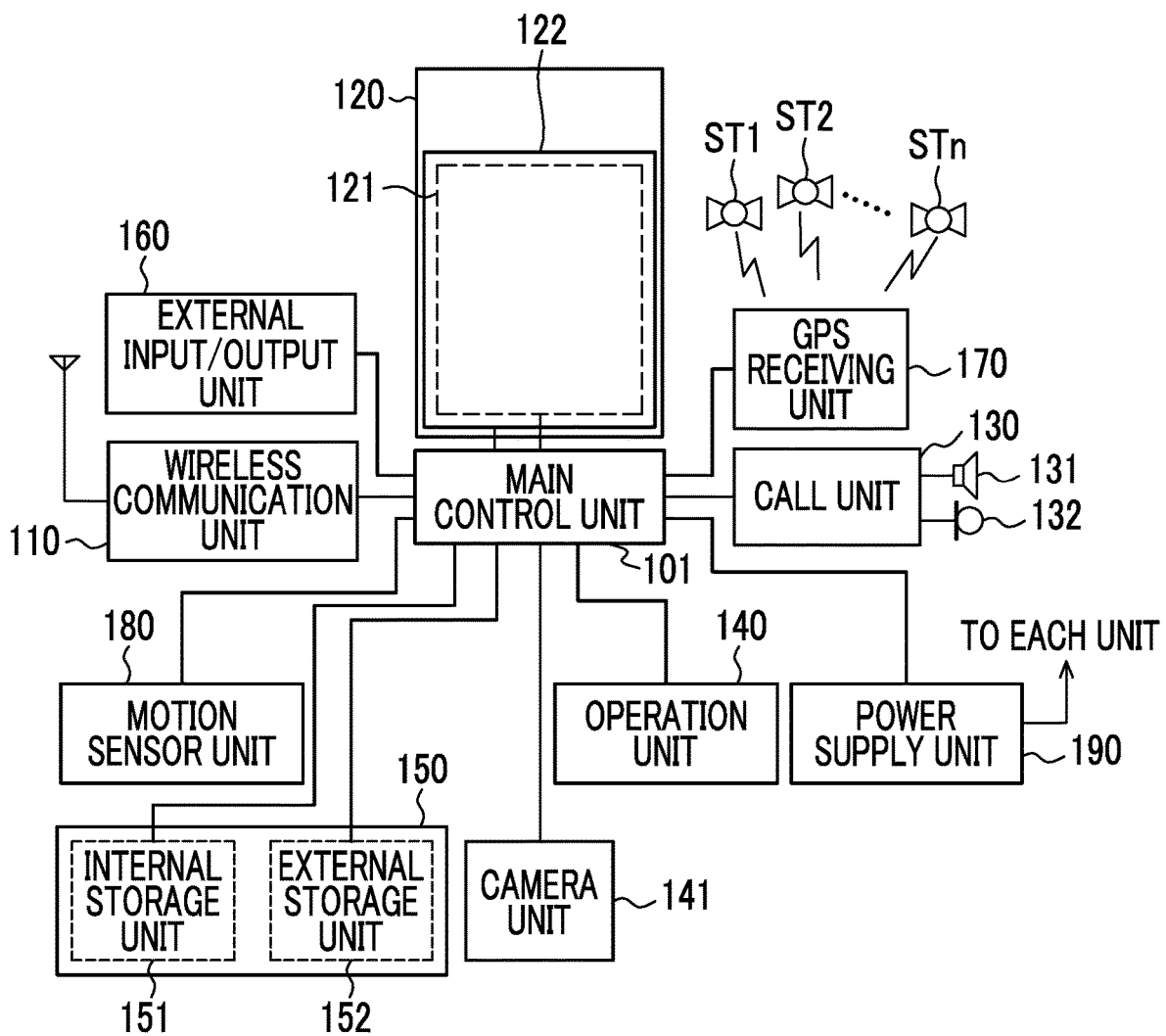
FIG. 6 is a block diagram illustrating a configuration of a smartphone 100 illustrated in FIG. 5.

FIG. 6 is a block diagram illustrating a configuration of the smartphone 100 illustrated in FIG. 5. As illustrated in FIG. 6, as main components of the smartphone 100, a wireless communication unit 110, the display input unit 120, a call unit 130, the operation unit 140, the camera unit 141 functioning as an image capturing unit, a storage unit 150, an external input/output unit 160, a global positioning system (GPS) receiving unit 170, a motion sensor unit 180, a power supply unit 190, and a main control unit 101 are provided. Further, as a main function of the smartphone 100, the smartphone 100 has a wireless communication function of performing mobile wireless communication via a base station apparatus and a mobile communication network.

The wireless communication unit 110 performs wireless communication with the base station apparatus in the mobile communication network according to an instruction of the main control unit 101. The wireless communication unit 110 transmits and receives various file data such as voice data and image data, e-mail data, and the like, and receives web data, streaming data, and the like by using wireless communication.

Under a control of the main control unit 101, the display input unit 120 visually informs the user of information by displaying images (still images and moving images), character information, and the like. The display input unit 120 is a so-called touch panel that detects a user's operation on the displayed information, and includes the display panel 121 and the operation panel 122. In a case where the user views a generated three-dimensional image, the display panel 121 is preferably a three-dimensional display panel.

The display panel 121 uses a liquid crystal display (LCD), an organic electro-luminescence display (OELD), or the like as a display device.

The operation panel 122 is a device that is provided so as to allow the user to visibly confirm an image displayed on a display surface of the display panel 121 and detects one or a plurality of coordinates obtained by a finger operation or a stylus operation by the user. In a case where the device is operated by a finger operation or a stylus operation by the user, a detection signal generated by the operation is output to the main control unit 101. Next, the main control unit 101 detects an operation position (coordinate) on the display panel 121 based on the received detection signal.

As illustrated in FIG. 5, the display panel 121 and the operation panel 122 of the smartphone 100 are integrated as one body and are provided as the display input unit 120. In this configuration, the operation panel 122 is disposed so as to completely cover the display panel 121. In a case where the configuration is adopted, the operation panel 122 may have a function of detecting an operation of a user even in a region outside the display panel 121. In other words, the operation panel 122 may include a detection region (hereinafter, referred to as a display region) for an overlapping portion that overlaps with the display panel 121 and a detection region (hereinafter, referred to as a non-display region) for an outer edge portion other than the overlapping portion that does not overlap with the display panel 121.

A size of the display region and a size of the display panel 121 may be completely matched with other, or may not necessarily need to be matched with each other. Further, the operation panel 122 may include an outer edge portion and two sensitive regions in an inner portion other than the outer edge portion. Further, a width of the outer edge portion is appropriately designed according to a size of the housing 102 and the like. Further, as a position detection method adopted in the operation panel 122, a method using a matrix switch, a method using a resistive film, a method using a surface acoustic wave, a method using infrared rays, an electromagnetic induction method, a capacitive method, or the like may be used, and any one of the methods may be adopted.

The call unit 130 includes a speaker 131 and a microphone 132, and is a unit that converts a user's voice input through the microphone 132 into voice data which can be processed by the main control unit 101 and outputs the voice data to the main control unit 101 and that decodes voice data received by the wireless communication unit 110 or the external input/output unit 160 and outputs the voice data from the speaker 131. Further, as illustrated in FIG. 5, for example, the speaker 131 and the microphone 132 may be provided on the same surface as the surface on which the display input unit 120 is provided.

The operation unit 140 is a hardware key using a key switch and the like, and receives an instruction from the user. For example, the operation unit 140 is provided on a lower portion and a lower side surface of the display unit of the housing 102 of the smartphone 100, and is a push button type switch that is turned on when pressed by a finger or the like and is turned off by a restoring force of a spring or the like when the finger is released.

The storage unit 150 is a unit that stores a control program and control data of the main control unit 101, address data associated with a name and a telephone number of a communication partner, transmitted/received e-mail data, web data downloaded by web browsing, and downloaded content data and that temporarily stores streaming data and the like. Further, the storage unit 150 includes an internal storage unit 151 that is built in the smartphone and an external storage unit 152 including a slot for attachable and detachable external memory. Each of the internal storage unit 151 and the external storage unit 152 included in the storage unit 150 is realized by using a storage medium such as a flash memory, a hard disk, a MultiMediaCard micro memory, a card type memory (for example, a micro SD (registered trademark) memory), a random access memory (RAM), and a read only memory (ROM).

The external input/output unit 160 serves as an interface between the smartphone 100 and all external apparatuses connected to the smartphone 100, and is a unit that directly or indirectly connects the smartphone 100 to another external apparatus by communication (for example, a universal serial bus) or by a network (for example, the Internet, a wireless local area network (LAN), Bluetooth (registered trademark), radio frequency identification (RFID), infrared data association (IrDA), Ultra Wideband (UWB) (registered trademark), ZigBee (registered trademark), or the like).

Examples of the external apparatus connected to the smartphone 100 include a wired/wireless headset, a wired/wireless external charger, a wired/wireless data port, a memory card or a subscriber identity module (SIM)/user identity module (UIM) card connected via a card socket, an external audio/video apparatus connected via an audio/video input/output (I/O) terminal, an external audio/video apparatus connected in a wireless manner, a smartphone connected in a wired/wireless manner, a personal computer connected in a wired/wireless manner, a mobile information terminal connected in a wired/wireless manner, and earphones. The external input/output unit may transmit data transmitted from such an external apparatus to each component in the smartphone 100, or may transmit data in the smartphone 100 to the external apparatus. In this example, the external input/output unit 160 functions as a biometric information acquisition unit that acquires biometric information by performing short-range wireless communication such as Bluetooth between the wearable terminals 1 and 2.

The GPS receiving unit 170 receives GPS signals transmitted from GPS satellites ST1 to STn according to an instruction of the main control unit 101, executes positioning calculation processing based on the received plurality of GPS signals, and detects position information (GPS information) including a latitude, a longitude, and an altitude of the smartphone 100. In a case where the GPS receiving unit 170 can acquire position information from the wireless communication unit 110 or the external input/output unit 160 (for example, wireless LAN), the GPS receiving unit 170 can also detect the position using the position information.

The motion sensor unit 180 includes, for example, a three-axis acceleration sensor, and detects a physical movement of the smartphone 100 according to an instruction of the main control unit 101. By detecting the physical movement of the smartphone 100, a movement direction and acceleration of the smartphone 100 are detected. The detection result is output to the main control unit 101.

The power supply unit 190 supplies electric power stored in a battery (not illustrated) to each unit of the smartphone 100 according to an instruction of the main control unit 101.

The main control unit 101 includes a microprocessor, operates according to a control program and control data stored in the storage unit 150, and collectively controls each unit of the smartphone 100. In addition, the main control unit 101 has a mobile communication control function for controlling each unit of a communication system and an application processing function so as to perform voice communication and data communication via the wireless communication unit 110.

The application processing function is realized by operating the main control unit 101 according to application software stored in the storage unit 150. Examples of the application processing function include an infrared communication function of performing data communication with an opposite apparatus by controlling the external input/output unit 160, an e-mail function of transmitting and receiving an e-mail, a web browsing function of browsing a web page, a function of automatically acquiring the biometric information from the wearable terminal 1 by dedicated application software of the wearable terminal 1, and a function of acquiring the "room-and-image combination" data by a program for acquiring the "room-and-image combination" data.

Further, the main control unit 101 has an image processing function such as displaying an image on the display input unit 120 based on image data (a still image or moving image data) such as received data or downloaded streaming data. The image processing function refers to a function in which the main control unit 101 decodes the image data, performs image processing on the decoding result, and displays an image on the display input unit 120.

Further, the main control unit 101 executes a display control for the display panel 121 and an operation detection control for detecting an operation of a user via the operation unit 140 and the operation panel 122.

By executing the display control, the main control unit 101 displays an icon for starting the application software, a software key such as a scroll bar, or a window for transmitting an e-mail. The scroll bar is a software key for receiving, in a large image which cannot fit in the display region of the display panel 121, an instruction to move a display portion of the image.

Further, by executing the operation detection control, the main control unit 101 detects an operation of the user via the operation unit 140, receives an operation on the icon and a character string input in an input field of the window via the operation panel 122, or receives a scroll request for a display image via the scroll bar.

Further, by executing the operation detection control, the main control unit 101 has a touch panel control function of determining whether an operation position on the operation panel 122 is in an overlapping portion (display region) that overlaps with the display panel 121 or in an outer edge portion (non-display region) other than the overlapping portion that does not overlap with the display panel 121, and controlling the sensitive region of the operation panel 122 and the display position of the software key.

Further, the main control unit 101 can also detect a gesture operation on the operation panel 122, and execute a preset function according to the detected gesture operation. The gesture operation is not a simple touch operation in the related art, and means an operation of drawing a trace with a finger or the like, an operation of designating a plurality of positions at the same time, or an operation of drawing a trace from at least one position of a plurality of positions by a combination of the operations.

The camera unit 141 is an image capturing device that electronically captures an image using an image sensor such as a complementary metal oxide semiconductor (CMOS) or a charge-coupled device (CCD).

In addition, the camera unit 141 may convert visible light image data obtained by image capturing into compressed image data such as joint photographic coding experts group (JPEG), and store the compressed image data in the storage unit 150 or output the compressed image data via the external input/output unit 160 or the wireless communication unit 110, under a control of the main control unit 101. Further, similarly, the camera unit 141 may store a distance image indicating a distance of a subject in the storage unit 150 or output the distance image via the external input/output unit 160 or the wireless communication unit 110. As illustrated in FIG. 2, in the smartphone 100, the camera unit 141 is provided on the same surface as the display input unit 120. On the other hand, a position of the camera unit 141 is not limited thereto, and the camera unit 141 may be provided on a back surface of the display input unit 120. Alternatively, a plurality of camera units 141 may be provided. In a case where a plurality of camera units 141 are provided, image capturing may be performed by switching the camera unit 141 to be used for image capturing and independently using the camera unit 141 or by using the plurality of camera units 141 at the same time.

Further, the camera unit 141 may be used for various functions of the smartphone 100. For example, the image acquired by the camera unit 141 may be displayed on the display panel 121, or the image of the camera unit 141 may be used as one input of operation inputs of the operation panel 122. Further, in a case where the GPS receiving unit 170 detects a position, the position may be detected by referring to the image from the camera unit 141. Further, by referring to the image from the camera unit 141, without using the three-axis acceleration sensor or in combination with the three-axis acceleration sensor, it is possible to determine an optical axis direction of the camera unit 141 of the smartphone 100 or determine a current use environment of the camera unit 141.

Of course, the image from the camera unit 141 may also be used in the application software.

[Wearable Terminal 1]

The wearable terminal 1 illustrated in FIG. 5 is a wristband-type wearable terminal worn on a wrist of the user, and can detect the biometric information of the user.

The biometric information is information that can be measured from a living body, and typically includes vital signs such as a heart rate, a pulse, a blood pressure, a body temperature, a breathing rate, a perspiration amount, and a brain wave pattern. Further, the biometric information may include an emotion such as joy, anger, grief, or pleasure, a posture (a sleeping posture, a standing posture, a sitting posture, a walking posture, a running posture, or the like), an exercise amount, the number of steps, a calorie consumption amount, and a sleep time which are obtained by analyzing the measurement results.

Figure 7:
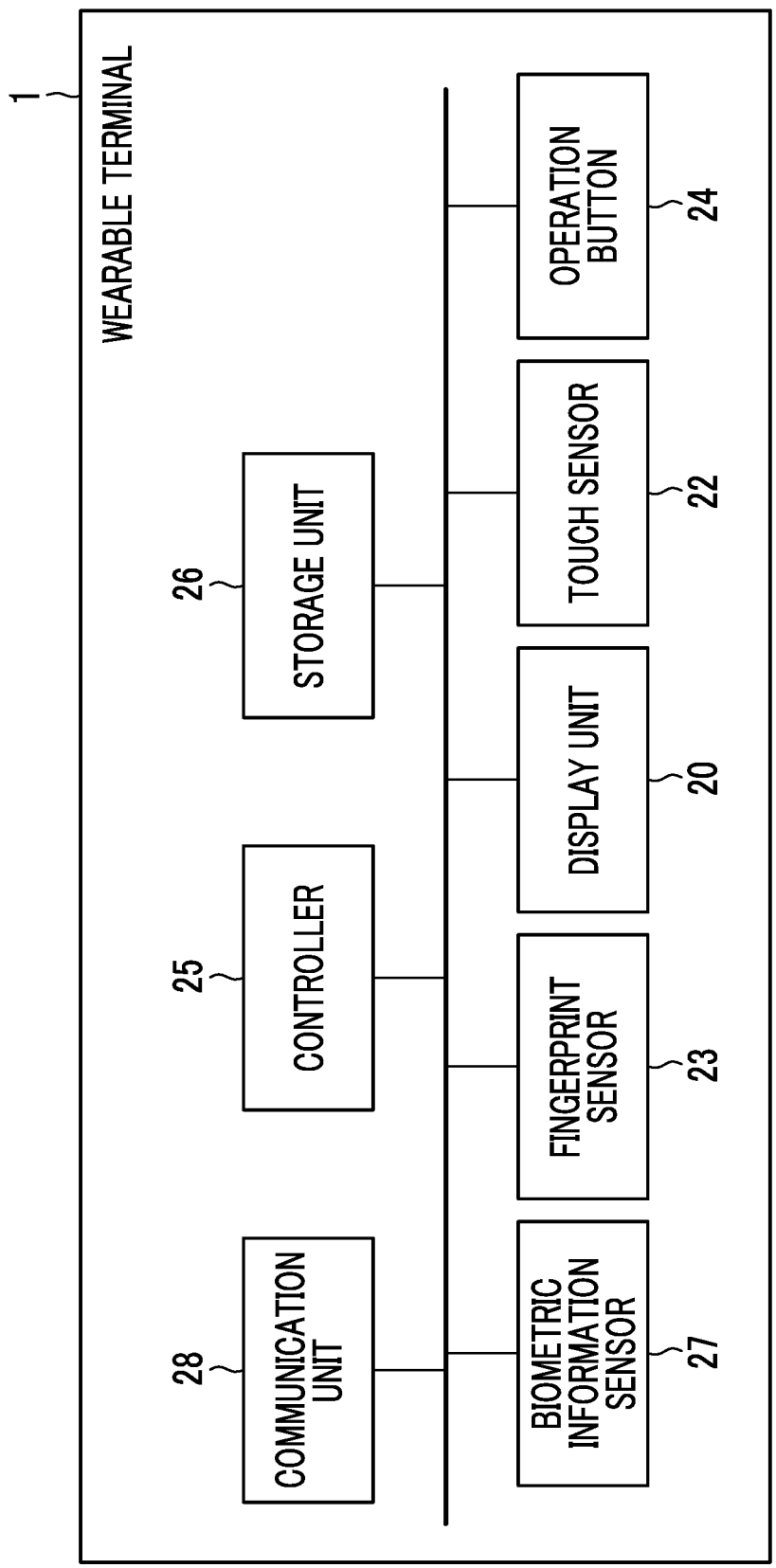
FIG. 7 is a block diagram illustrating a configuration of a wearable terminal 1 illustrated in FIG. 5.

FIG. 7 is a block diagram illustrating a configuration of the wearable terminal 1 illustrated in FIG. 5.

The wearable terminal 1 illustrated in FIGS. 5 and 7 includes a display unit 20 including a display screen 21 (for example, LCD, OELD, or the like), which is an example of a screen on which various information such as measurement results of biometric information of the user can be displayed, a touch sensor 22 which can detect a touch position as a position of a touch operation on the display screen 21 of the display unit 20, a fingerprint sensor 23, which is an example of a detection unit that can detect a fingerprint of the user, an operation button 24 which is provided on a side surface of a main body of the wearable terminal 1 and can input various operations to the wearable terminal 1, a controller 25, a storage unit 26, a biometric information sensor 27, and a communication unit 28. In the present embodiment, the display unit 20 and the touch sensor 22 function as a so-called touch panel display.

The controller 25 is configured with a central processing unit (CPU) or the like, and controls each unit included in the wearable terminal 1 by executing a program stored in the storage unit 26. The storage unit 26 is configured with a ROM, a RAM, and the like, and can store various information such as a program to be executed by the controller 25 and data to be used in a case where the controller 25 executes the program.

The biometric information sensor 27 includes a heart rate sensor, a thermometer, an acceleration sensor, and the like, and measures biometric information (for example, a heart rate, a body temperature, an exercise state, and the like) of a user who wears the wearable terminal 1. The communication unit 28 can perform communication with an external apparatus such as a smartphone 100 by wireless communication.

First Embodiment of Image Suggestion Apparatus

Figure 8:
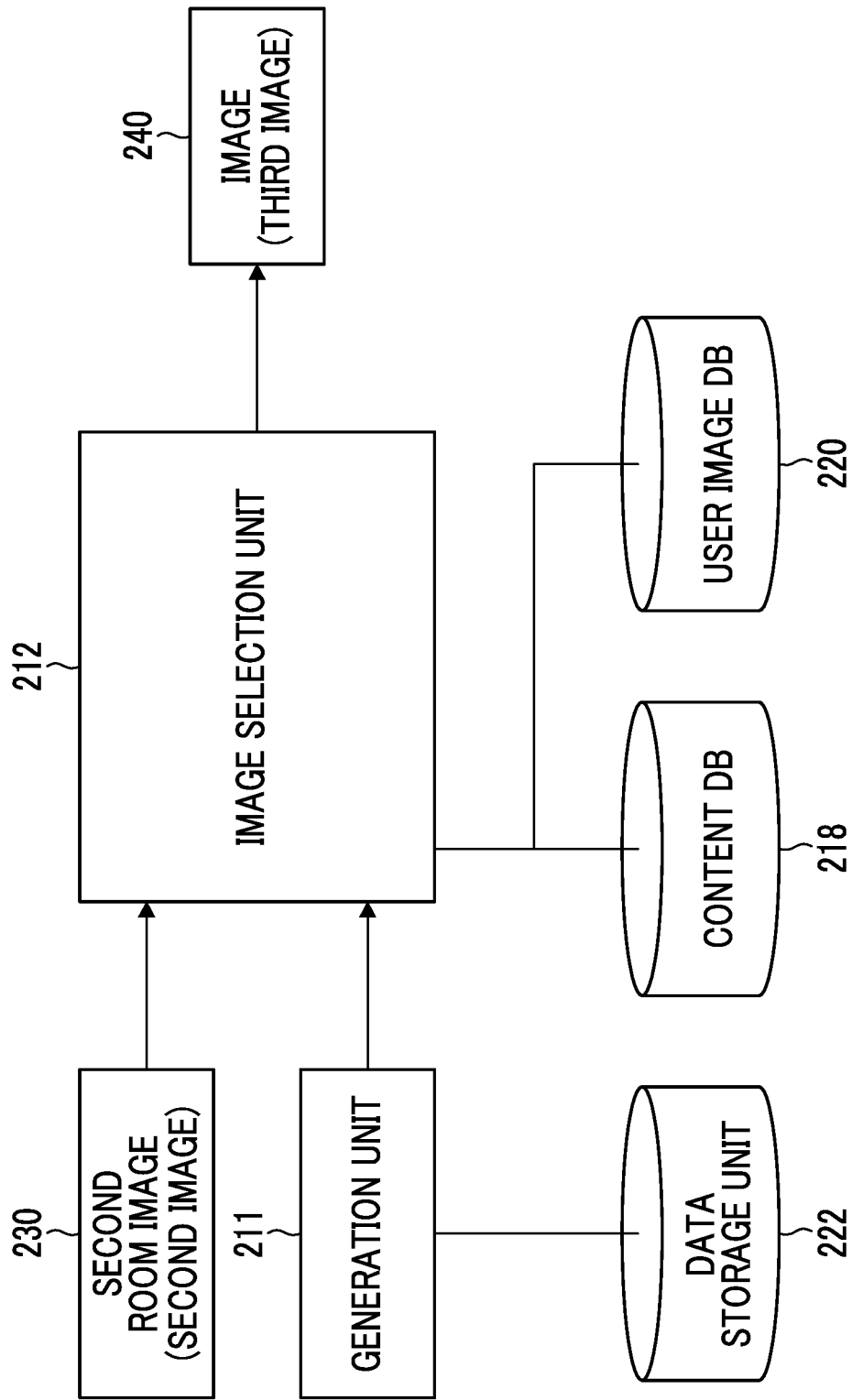
FIG. 8 is a block diagram illustrating a first embodiment of the image suggestion apparatus 200 illustrated in FIGS. 1 and 2.

FIG. 8 is a block diagram illustrating a first embodiment of the image suggestion apparatus 200 illustrated in FIGS. 1 and 2.

The user captures his/her room (second room) image by the smartphone 100, and transmits the captured room image (second image) 230 to the image suggestion apparatus 200 via the network 3 (FIG. 1).

In FIG. 8, the image selection unit 212 inputs the room image 230 received by the communication unit 210 (FIG. 2) of the image suggestion apparatus 200.

The generation unit 211 generates the "room-and-image" relationship information in which the preference of the user is reflected by using the "room-and-image combination" data corresponding to the user who transmits the room image 230 among the "room-and-image combination" data stored in the data storage unit 222, and outputs the generated "room-and-image" relationship information to the image selection unit 212. Preferably, the generation unit 211 generates the "room-and-image" relationship information in advance (a timing different from a timing when the room image 230 is received) by a machine learning method using the "room-and-image combination" data.

Figure 9:
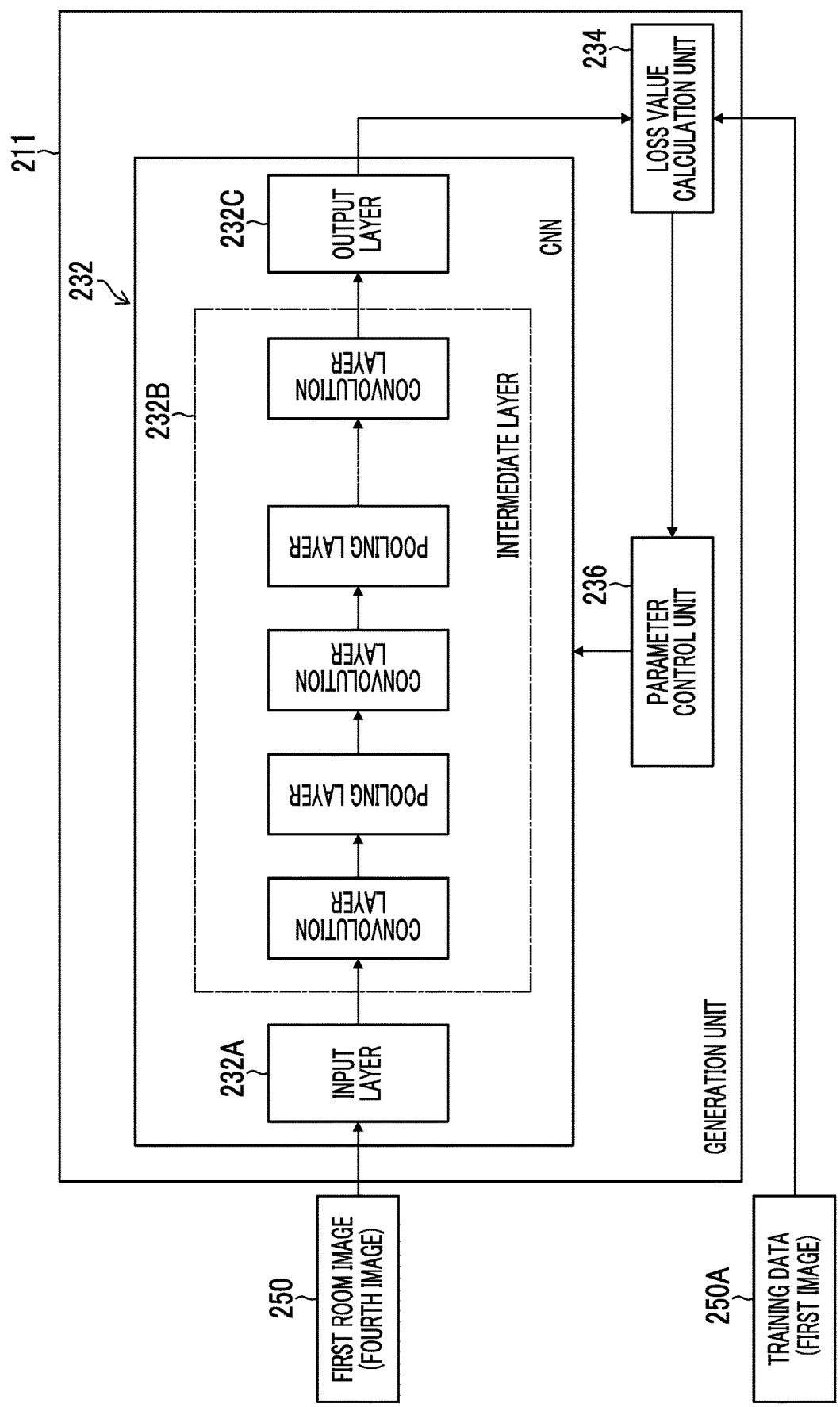
FIG. 9 is a functional block diagram illustrating an embodiment of a generation unit 211 illustrated in FIG. 8.

FIG. 9 is a functional block diagram illustrating an embodiment of the generation unit 211 illustrated in FIG. 8.

The generation unit 211 illustrated in FIG. 9 mainly includes a convolution neural network (CNN) 232, a loss value calculation unit 234, and a parameter control unit 236.

The CNN 232 has a plurality of layer structures, and holds a plurality of weight parameters. The CNN 232 changes from an unlearned model to a learned model by updating the weight parameter from an initial value to an optimum value.

The CNN 232 includes an input layer 232A, an intermediate layer 232B including a plurality of sets of convolution layers and pooling layers, and an output layer 232C, and each layer has a structure in which a plurality of "nodes" are connected by "edges".

A first room image (fourth image) 250 (FIG. 3), which is the "room-and-image combination" data stored in the data storage unit 222, is input to the input layer 232A.

The intermediate layer 232B includes a plurality of sets each including a convolution layer and a pooling layer, and is a portion that extracts a feature from the image 250 which is input from the input layer 232A. The convolution layer acquires a "feature map" by performing filter processing on a node adjacent to a previous layer (performing a convolution operation using a filter). The pooling layer reduces the feature map which is output from the convolution layer, and sets the reduced feature map as a new feature map. The "convolution layer" serves for feature extraction such as edge extraction from an image, and the "pooling layer" serves to impart robustness to the extracted feature such that the extracted feature is not affected by parallel movement or the like. The intermediate layer 232B is not limited to the case where the convolution layer and the pooling layer are set as one set. For example, a case where the convolution layers are continuously provided may be applied, or a case where a normalization layer is provided may be applied.

Certain initial values are set to a coefficient of the filter applied to each convolution layer of the unlearned CNN 232 and a weight of an offset value for connection with the next layer. On the other hand, preferably, a parameter of the CNN used for image classification is set as the initial value.

The loss value calculation unit 234 acquires an output from the output layer 232C of the CNN 232 (feature map) and an image (first image) 250A as training data (also referred to as teacher data), and calculates a loss value between the output and the image. As a method of calculating the loss value, for example, softmax cross entropy, sigmoid, or the like may be used. Here, the image 250A as the training data is an image included in the room image 250, is an image for decorating the room, and corresponds to an image cut out from the image 250.

The parameter control unit 236 adjusts the weight parameter of the CNN 232 by an error inverse propagation method based on the loss value calculated by the loss value calculation unit 234.

The parameter of the learned CNN 232 learned in this way is the "room-and-image" relationship information.

The image selection unit 212 selects an image (third image) 240 in which the preference of the user is reflected, from the image group which is registered in the content DB 218 or the image group which is registered in the user image DB 220 and is owned by the user, based on the user's room image 230 (FIG. 4) which is acquired via the communication unit 210 and the "room-and-image" relationship information which is generated by the generation unit 211.

Thereby, as an image for decorating the user's room, the image 240 which matches with the user's room and in which the preference of the user is reflected can be selected. Whether to select the image 240 from the image group registered in the content DB 218 or whether to select the image 240 from the image group registered in the user image DB 220 may be specified by the user. Alternatively, the image 240 may be selected from each of the both image groups.

The generation unit 211 illustrated in FIG. 9 acquires the parameter of the CNN 232 corresponding to the "room-and-image" relationship information by using, as the "room-and-image combination" data stored in the data storage unit 222, the room image 250 acquired from the website 4 while browsing the website 4 on the smartphone 100 and using, as the learning data, the image 250 and the image (first image) 250A which is included in the image 250 and is for decorating the room. On the other hand, the generation unit 211 may store, as the "room-and-image combination" data, a pair of feature amounts of the room image 250 and the image 250A in the data storage unit 222, and acquire the "room-and-image" relationship information by performing machine learning based on the pair of the feature amounts.

The image processing unit 214 (FIG. 2) generates a display image including the image 240 based on the image 240 selected by the image selection unit 212. The image suggestion apparatus 200 transmits the display image to the smartphone 100 of the user via the communication unit 210 and the network 3.

Figure 10:
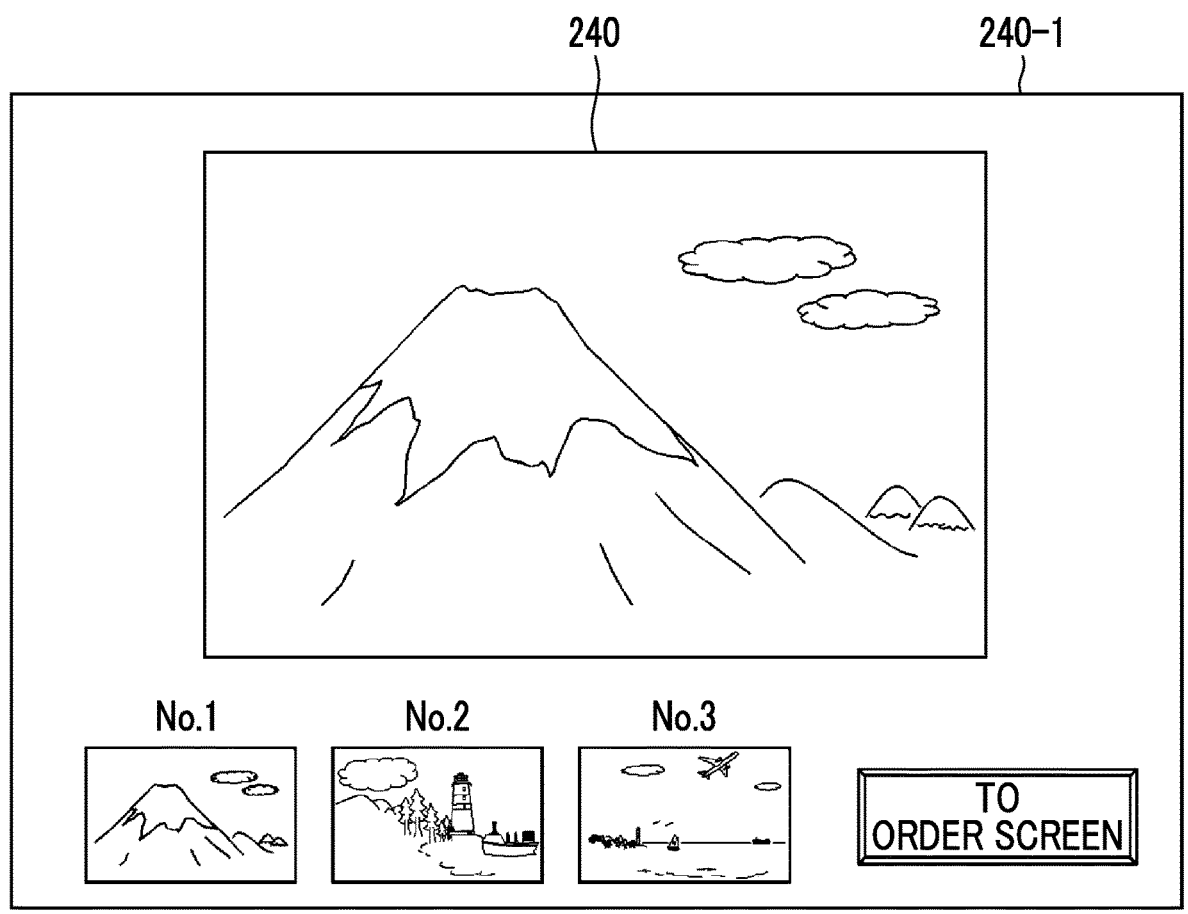
FIG. 10 is a diagram illustrating an example of a display screen of the smartphone 100 that displays an image suggested by the image suggestion apparatus 200.

FIG. 10 is a diagram illustrating an example of a display screen of the smartphone 100 that displays an image suggested by the image suggestion apparatus 200.

An image 240-1 including an image 240 selected by the image selection unit 212 is displayed on the display screen of the smartphone 100 illustrated in FIG. 10 based on the display image received from the image suggestion apparatus 200. Thereby, the image 240 corresponding to the image print for decorating the user's room is suggested to the user.

The example illustrated in FIG. 10 illustrates a case where, as the image which matches with the user's room and in which the preference of the user is reflected, high-rank three images (No. 1, No. 2, and No. 3) with highest matching degrees are selected by the image selection unit 212 and thumbnail images of the three images and the image 240, which is a main image corresponding to the No. 1 thumbnail image, are displayed on the display screen.

In a case where the user wants to confirm details of an image other than the image 240, for example, the user selects the No. 2 thumbnail image or the No. 3 thumbnail image. In this case, a main image corresponding to the thumbnail image is displayed instead of the image 240.

In addition, a "to order screen" icon button is displayed on the display screen. In a case where the user operates the icon button, the screen may transition to a screen for ordering a photo print corresponding to the image enlarged and displayed on the display screen.

Thereby, the image suggestion apparatus 200 can suggest, to the user, an image which matches with the user's room and in which the preference of the user is reflected.

In the example illustrated in FIG. 10, the user can select a desired image from the three images corresponding to the high-rank three image prints with highest matching degrees. On the other hand, the number of images to be presented is not limited thereto. Further, only the image with a highest matching degree may be suggested. In this case, in order to deal with a case where the user does not like the suggested image, preferably, the user is allowed to request suggestion of another image (for example, an image with the next highest matching degree) by inputting an instruction.

Further, in a case where a plurality of images are suggested, a suggestion order may be determined by estimating a preference order of the user based on the biometric information of the user.

Second Embodiment of Image Suggestion Apparatus

Figure 11:
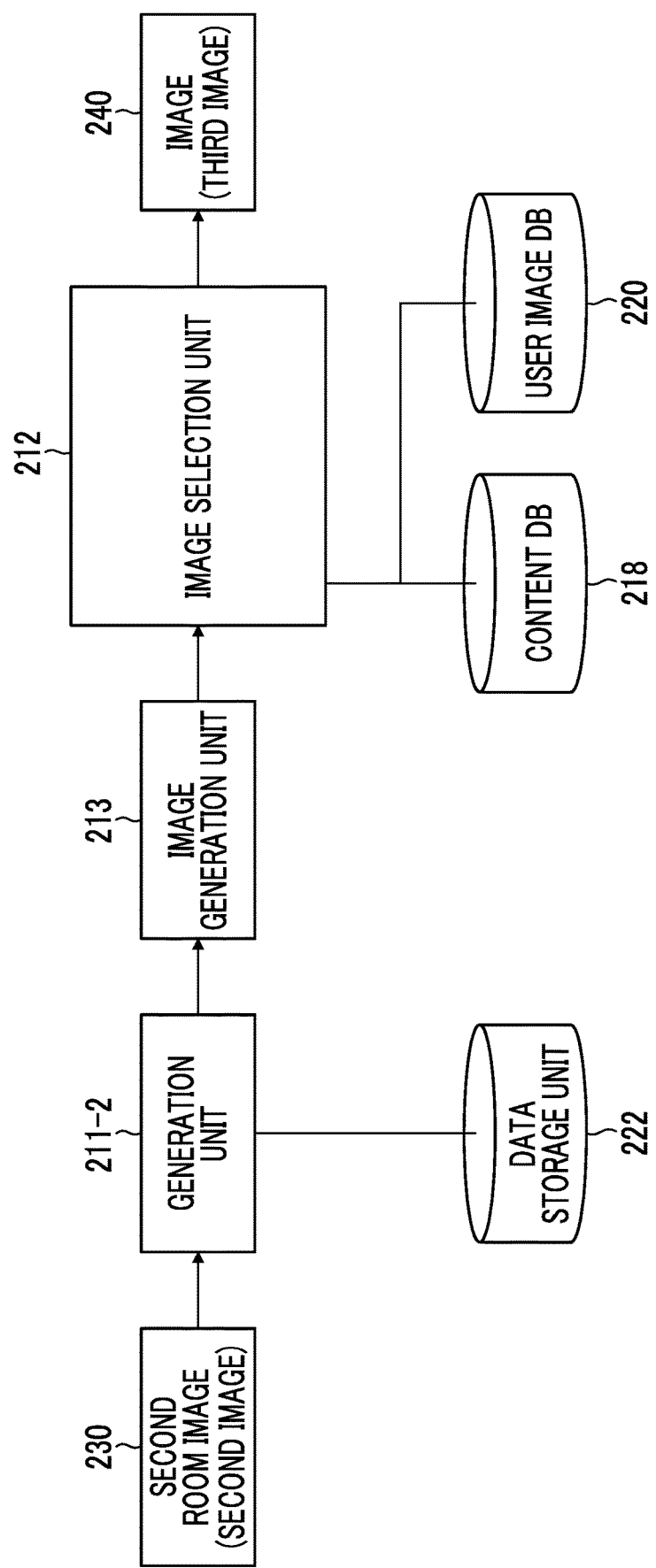
FIG. 11 is a block diagram illustrating a second embodiment of the image suggestion apparatus 200 illustrated in FIGS. 1 and 2.

FIG. 11 is a block diagram illustrating a second embodiment of the image suggestion apparatus 200 illustrated in FIGS. 1 and 2. In FIG. 11, the same reference numerals are given to the components that are common to the first embodiment of the image suggestion apparatus 200 illustrated in FIG. 8, and a detailed description thereof will be omitted.

The second embodiment of the image suggestion apparatus 200 illustrated in FIG. 11 is mainly different from the first embodiment in that a generation unit 211-2 and an image generation unit 213 are provided.

The generation unit 211-2 corresponds to the generation unit 211 illustrated in FIG. 9, and particularly corresponds to the learned CNN 232 (recognizer). The learned CNN 232 can output, from the feature amount of the room image, a recognition result (feature map) indicating a feature amount of an image, which is for decorating the room, matches with the room, and in which the preference of the user is reflected.

Therefore, in a case where the user's room image 230 is input as an input image, the generation unit 211-2 outputs a feature map indicating the feature amount of the image which matches with the user's room and in which the preference of the user is reflected.

The image generation unit 213 is configured with, for example, a reverse convolution neural network, and generates (restores) an image (fifth image) which matches with the user's room indicated by the image 230 and in which the preference of the user is reflected by converting the feature map in the feature amount space that is generated by the generation unit 211-2 into an image in an image space.

The image selection unit 212 selects one or a plurality of images similar to the fifth image, from the image group registered in the content DB 218 or the image group registered in the user image DB 220 and owned by the user, based on the fifth image generated by the image generation unit 213. The image 240 selected by the image selection unit 212 in this way is an image which matches with the user's room and in which the preference of the user is reflected.

In the second embodiment illustrated in FIG. 11, the image (fifth image) is restored by the image generation unit 213 from the feature map which is output from the generation unit 211-2, and one or a plurality of images similar to the fifth image are selected from the image group registered in the content DB 218 or the image group registered in the user image DB 220, based on the fifth image. On the other hand, the second embodiment is not limited thereto. For example, one or a plurality of images having a similar feature amount may be selected from the image group registered in the content DB 218 or the image group registered in the user image DB 220, based on the feature map (feature amount) output from the generation unit 211-2.

Other Embodiments of Suggested Image

Figure 12:
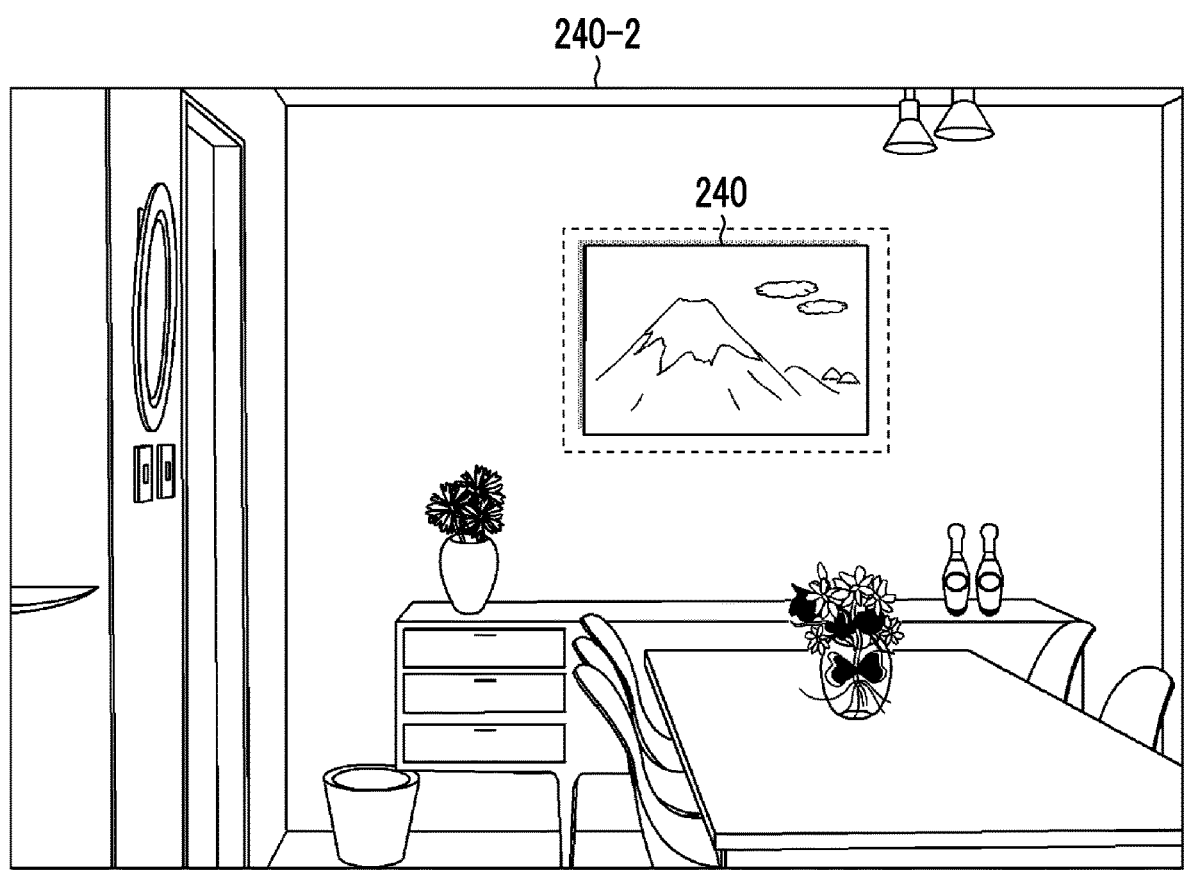
FIG. 12 is a diagram illustrating another example of a display screen of the smartphone 100 that displays an image suggested by the image suggestion apparatus 200.

FIG. 12 is a diagram illustrating another example of a display screen of the smartphone 100 that displays an image suggested by the image suggestion apparatus 200.

The image processing unit 214, which functions as a part of the suggestion unit, has a function of generating, as a display image, a combination image (fifth image) 240-2 in which the image 240 is combined in a wall region of the user's room image 230, based on the user's room image 230 (FIG. 4) and the image 240 selected by the image selection unit 212.

On the display screen of the smartphone 100 illustrated in FIG. 12, based on the display image received from the image suggestion apparatus 200, the combination image 240-2 in which the image 240 selected by the image selection unit 212 is combined in the wall region of the room image is displayed.

Thereby, the user can more accurately confirm an atmosphere or a harmony in a case where the suggested image 240 is disposed on the wall of his/her room.

[Image Suggestion Method]

Figure 13:
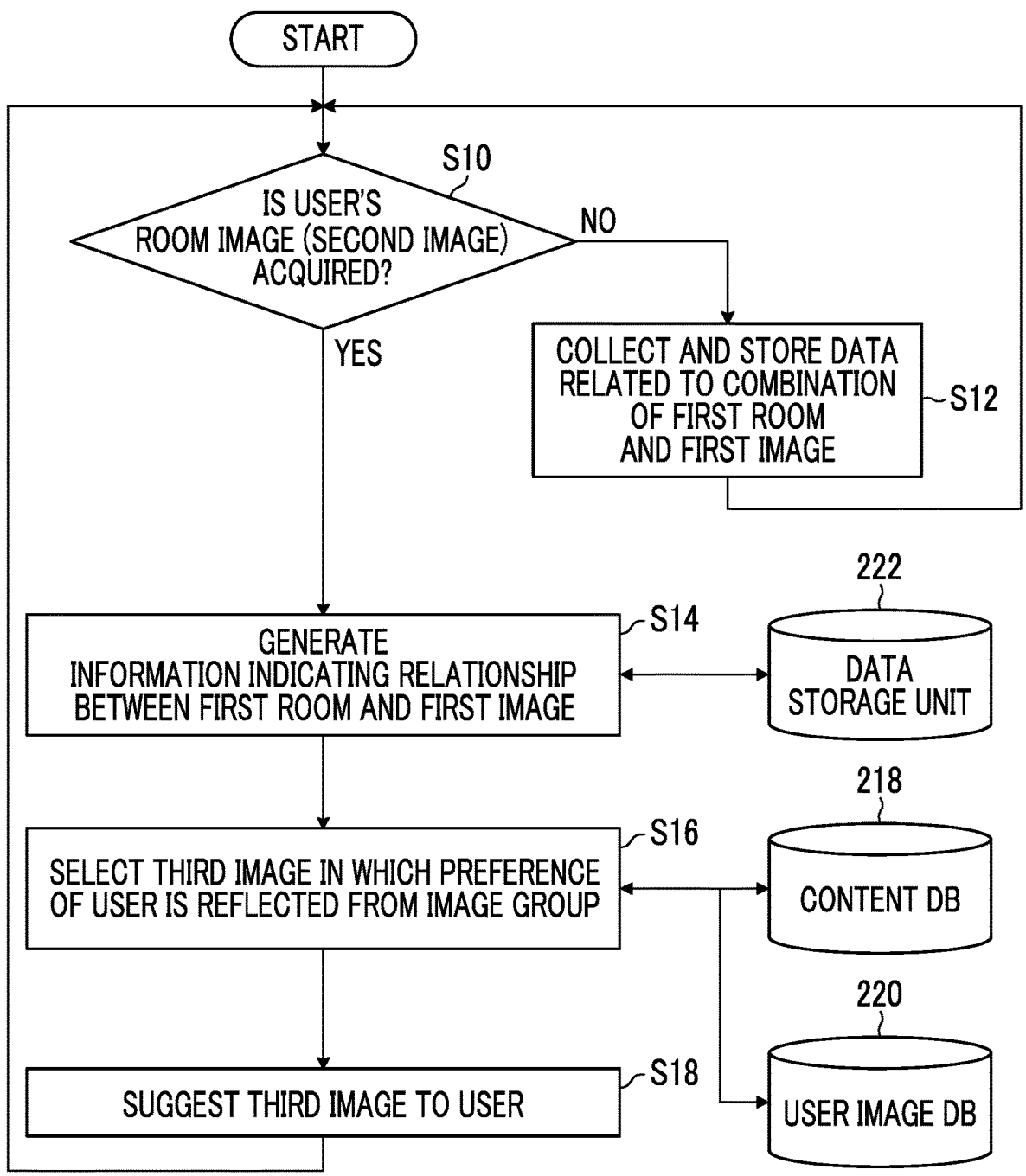
FIG. 13 is a flowchart illustrating an embodiment of an image suggestion method according to an aspect of the present invention.

FIG. 13 is a flowchart illustrating an embodiment of an image suggestion method according to one aspect of the present invention, and illustrates an operation of each unit of the image suggestion apparatus 200 illustrated in FIG. 2.

In FIG. 13, the control unit (not illustrated) that collectively controls each unit of the image suggestion apparatus 200 illustrated in FIG. 2 determines whether or not the user's room image captured by the user is acquired via the communication unit 210 (step S10).

In a case where the user's room image is not acquired (in a case of "No"), the "room-and-image combination" data, which is acquired by the program that always operates in the smartphone 100 of the user while browsing the website, is received from the smartphone 100, and is collected and stored in the data storage unit 222 (step S12).

In a case where the user's room image is acquired (in a case of "Yes"), the generation unit 211 generates the "room-and-image" relationship information in which the preference of the user is reflected by using the "room-and-image combination" data that is stored in the data storage unit 222 and corresponds to the user (step S14). The "room-and-image" relationship information may be generated and stored in advance for each user.

Subsequently, the image selection unit 212 selects an image (third image) in which the preference of the user is reflected, from the image group which is registered in the content DB 218 or the image group which is registered in the user image DB 220, based on the user's room image (FIG. 4) which is acquired via the communication unit 210 and the generated "room-and-image" relationship information (step S16).

The image processing unit 214 and the communication unit 210 suggest the third image selected in step S16, as an image (third image) corresponding to the image print for decorating the user's room, by displaying the third image on the display screen of the smartphone 100 (step S18).

Thereby, in a case where the user transmits his/her room image to the image suggestion apparatus 200, the user can receive a suggestion of an image which matches with his/her room and in which the preference of the user is reflected.

[Others]

The image suggestion apparatus 200 according to the present embodiment may be a store terminal apparatus provided in a store or the like that receives an order for an image print. In this case, the store terminal apparatus may directly receive the user's room image, display an image to be suggested to the user on a monitor of the store terminal apparatus, and receive a user's operation such as a print order.

Further, in a case of a user for whom the "room-and-image combination" data is not stored in the data storage unit 222, or in a case of a user (first user) for whom the "room-and-image combination" data is insufficient, the "room-and-image" relationship information in which the preference of the first user is reflected may be generated by using the "room-and-image combination" data of another user (second user) with an attribute (a gender, an age, a preference, or the like) similar to an attribute of the first user.

Further, the present invention includes an image suggestion program, which causes a computer to function as an image suggestion apparatus according to the present invention by being installed in the computer, and a recording medium storing the image suggestion program.

Furthermore, the present invention is not limited to the above-described embodiment, and various modifications may be made without departing from the spirit of the present invention.

From the above description, the image suggestion apparatus according to the following Appendix 1 can be realized.

[Appendix 1]

An image suggestion apparatus including:

a memory that collects and stores data which is collected for each user and is related to a combination of a first room and a first image, the data being related to the combination preferred by the user; and a processor, in which the processor is configured to generate information which indicates a relationship between the first room and the first image and in which a preference of the user is reflected by using the data stored in the memory and corresponding to the user, acquire a second image which is a second room image captured by the user, and select a third image which is an image in which the preference of the user is reflected, from a registered image group or an image group owned by the user, based on the acquired second image and the generated information which indicates the relationship, and suggest, as an image corresponding to an image print for decorating the second room of the user, the selected third image to the user.

EXPLANATION OF REFERENCES 1, 2: wearable terminal
3: network
4: website
10: user terminal
20: display unit
21: display screen
22: touch sensor
23: fingerprint sensor
24: operation button
25: controller
26: storage unit 27: biometric information sensor
28, 210: communication unit
100: smartphone
101: main control unit
102: housing
110: wireless communication unit
120: display input unit
121: display panel
122: operation panel
130: call unit
131: speaker
132: microphone
140: operation unit
141: camera unit
150: storage unit
151: internal storage unit
152: external storage unit
160: external input/output unit
170: GPS receiving unit
180: motion sensor unit
190: power supply unit
200: image suggestion apparatus
210: communication unit
211, 211-2: generation unit
212: image selection unit
213: image generation unit
214: image processing unit
218: content DB
220: user image DB
222: data storage unit
230, 240, 240-1, 240-2, 250, 250A: image
232: CNN
234: loss value calculation unit
236: parameter control unit
S10 to S18: step

What is claimed is:

1. An image suggestion apparatus comprising:
a data storage unit that collects and stores data which is collected for each user and is related to a combination of a first room and a first image, the data being related to the combination preferred by the user;
a generation unit that generates information which indicates a relationship between the first room and the first image and in which a preference of the user is reflected by using the data stored in the data storage unit and corresponding to the user;
an image acquisition unit that acquires a second image which is a second room image captured by the user;
an image selection unit that selects a third image which is an image in which the preference of the user is reflected, from a registered image group or an image group owned by the user, based on the second image acquired by the image acquisition unit and the information which indicates the relationship and is generated by the generation unit; and
a suggestion unit that suggests, as an image corresponding to an image print for decorating the second room of the user, the third image selected by the image selection unit to the user,
wherein the generation unit includes a convolution neural network, a loss value calculation unit, and a parameter control unit,
the convolution neural network includes an input layer, an intermediate layer, and an output layer,
a fourth image, which is an image of the first room decorated with the first image, is input to the input layer,
the intermediate layer includes a plurality of sets each including a convolution layer and a pooling layer, acquires a feature map, outputs the acquired feature map to the output layer,
the loss value calculation unit acquires the feature map that is output from the output layer of the convolution neural network and the first image, and calculates a loss value between the feature map and the first image,
the parameter control unit adjusts the weight parameter of the convolution neural network based on the loss value calculated by the loss value calculation unit, and
the generation unit acquires the weight parameter of the convolution neural network as the room-and-image relationship information.

2. The image suggestion apparatus according to claim 1, further comprising:
a biometric information acquisition unit that acquires biometric information of the user; and
an image browsing unit that allows the user to browse an image,
wherein, while the user is browsing an image by using the image browsing unit, in a case where the fourth image appears on the image browsing unit, the data storage unit acquires the fourth image in which the preference of the user is reflected based on the biometric information of the user that is acquired from the biometric information acquisition unit, and collects data related to the combination preferred by the user from the acquired fourth image.

3. The image suggestion apparatus according to claim 2, wherein
the biometric information acquisition unit is a wearable terminal worn by the user,
the image browsing unit is a mobile terminal that acquires an image to be browsed via a network, displays the acquired image on a display unit, and acquires the biometric information of the user by performing communication with the wearable terminal, and
the data storage unit acquires the fourth image in which the preference of the user is reflected from the mobile terminal.

4. The image suggestion apparatus according to claim 1, further comprising:
an image generation unit that generates a fifth image which matches with the second room based on the second image and the information which indicates the relationship and is generated by the generation unit,
wherein the image selection unit selects, as the third image, one or a plurality of images similar to the generated fifth image from the registered image group or the image group owned by the user.

5. The image suggestion apparatus according to claim 4, further comprising:
a biometric information acquisition unit that acquires biometric information of the user; and
an image browsing unit that allows the user to browse an image,
wherein, while the user is browsing an image by using the image browsing unit, in a case where a fourth image, which is an image of the first room decorated with the first image, appears on the image browsing unit, the data storage unit acquires the fourth image in which the preference of the user is reflected based on the biometric information of the user that is acquired from the biometric information acquisition unit, and collects data related to the combination preferred by the user from the acquired fourth image.

6. The image suggestion apparatus according to claim 5, wherein
the biometric information acquisition unit is a wearable terminal worn by the user,
the image browsing unit is a mobile terminal that acquires an image to be browsed via a network, displays the acquired image on a display unit, and acquires the biometric information of the user by performing communication with the wearable terminal, and
the data storage unit acquires the fourth image in which the preference of the user is reflected from the mobile terminal.

7. The image suggestion apparatus according to claim 4, wherein the image selection unit extracts a feature amount indicating a feature of the fifth image which matches with the second room based on the second image and the information which indicates the relationship and is generated by the generation unit, and selects, as the third image, one or a plurality of images having a feature amount similar to the extracted feature amount from the registered image group or the image group owned by the user.

8. The image suggestion apparatus according to claim 1, wherein
the generation unit is a recognizer that performs machine learning using, as learning data, data which is stored in the data storage unit and corresponds to the user, and
the image selection unit inputs, as an input image of the recognizer, the second image acquired by the image acquisition unit, and selects, based on a recognition result output from the recognizer, as the third image, one or a plurality of images similar to the recognition result from the registered image group or the image group owned by the user.

9. The image suggestion apparatus according to claim 8, further comprising:
a biometric information acquisition unit that acquires biometric information of the user; and
an image browsing unit that allows the user to browse an image,
wherein, while the user is browsing an image by using the image browsing unit, in a case where a fourth image, which is an image of the first room decorated with the first image, appears on the image browsing unit, the data storage unit acquires the fourth image in which the preference of the user is reflected based on the biometric information of the user that is acquired from the biometric information acquisition unit, and collects data related to the combination preferred by the user from the acquired fourth image.

10. The image suggestion apparatus according to claim 9, wherein
the biometric information acquisition unit is a wearable terminal worn by the user,
the image browsing unit is a mobile terminal that acquires an image to be browsed via a network, displays the acquired image on a display unit, and acquires the biometric information of the user by performing communication with the wearable terminal, and
the data storage unit acquires the fourth image in which the preference of the user is reflected from the mobile terminal.

11. The image suggestion apparatus according to claim 8, wherein the image selection unit extracts a feature amount indicating a feature of the recognition result output from the recognizer, and selects, as the third image, one or a plurality of images having a feature amount similar to the extracted feature amount from the registered image group or the image group owned by the user.

12. The image suggestion apparatus according to claim 1, wherein the generation unit generates the information which indicates the relationship between the first room and the first image and in which the preference of the user is reflected by using, as the data corresponding to the user, data of a second user with an attribute similar to an attribute of the first user, among the data stored in the data storage unit.

13. The image suggestion apparatus according to claim 12, further comprising:
a biometric information acquisition unit that acquires biometric information of the user; and
an image browsing unit that allows the user to browse an image,
wherein, while the user is browsing an image by using the image browsing unit, in a case where a fourth image, which is an image of the first room decorated with the first image, appears on the image browsing unit, the data storage unit acquires the fourth image in which the preference of the user is reflected based on the biometric information of the user that is acquired from the biometric information acquisition unit, and collects data related to the combination preferred by the user from the acquired fourth image.

14. The image suggestion apparatus according to claim 13, wherein
the biometric information acquisition unit is a wearable terminal worn by the user,
the image browsing unit is a mobile terminal that acquires an image to be browsed via a network, displays the acquired image on a display unit, and acquires the biometric information of the user by performing communication with the wearable terminal, and
the data storage unit acquires the fourth image in which the preference of the user is reflected from the mobile terminal.

15. The image suggestion apparatus according to claim 1, wherein the suggestion unit suggests a plurality of the high-rank third images in which the preference of the user is reflected.

16. The image suggestion apparatus according to claim 15, further comprising:
a biometric information acquisition unit that acquires biometric information of the user; and
an image browsing unit that allows the user to browse an image,
wherein, while the user is browsing an image by using the image browsing unit, in a case where a fourth image, which is an image of the first room decorated with the first image, appears on the image browsing unit, the data storage unit acquires the fourth image in which the preference of the user is reflected based on the biometric information of the user that is acquired from the biometric information acquisition unit, and collects data related to the combination preferred by the user from the acquired fourth image.

17. The image suggestion apparatus according to claim 16, wherein
the biometric information acquisition unit is a wearable terminal worn by the user,
the image browsing unit is a mobile terminal that acquires an image to be browsed via a network, displays the acquired image on a display unit, and acquires the biometric information of the user by performing communication with the wearable terminal, and the data storage unit acquires the fourth image in which the preference of the user is reflected from the mobile terminal.

18. The image suggestion apparatus according to claim 1, wherein the suggestion unit combines the selected third image with a wall region of the second image acquired by the image acquisition unit, and presents the combined fifth image to the user.

19. An image suggestion method comprising:

collecting and storing data, which is collected for each user and is related to a combination of a first room and a first image, in a data storage unit, the data being related to the combination preferred by the user;

generating information which indicates a relationship between the first room and the first image and in which a preference of the user is reflected by using the data stored in the data storage unit and corresponding to the user;

acquiring a second image which is a second room image captured by the user;

selecting a third image which is an image in which the preference of the user is reflected, from a registered image group or an image group owned by the user, based on the acquired second image and the generated information which indicates the relationship; and suggesting, as an image corresponding to an image print for decorating the second room of the user, the selected third image to the user, wherein the generating information is performed by a generation unit that includes a convolution neural network, a loss value calculation unit, and a parameter control unit, the convolution neural network includes an input layer, an intermediate layer, and an output layer, a fourth image, which is an image of the first room decorated with the first image, is input to the input layer, the intermediate layer includes a plurality of sets each including a convolution layer and a pooling layer, acquires a feature map, and outputs the acquired feature map to the output layer, the loss value calculation unit acquires the feature map that is output from the output layer of the convolution neural network and the first image, and calculates a loss value between the feature map and the first image, the parameter control unit adjusts the weight parameter of the convolution neural network based on the loss value calculated by the loss value calculation unit, and the generation unit acquires the weight parameter of the convolution neural network as the room-and-image relationship information.

20. A non-transitory computer readable recording medium storing an image suggestion program causing a computer to realize:

a function of collecting and storing data, which is collected for each user and is related to a combination of a first room and a first image, in a data storage unit, the data being related to the combination preferred by the user;

a function of generating information which indicates a relationship between the first room and the first image and in which a preference of the user is reflected by using the data stored in the data storage unit and corresponding to the user;

a function of acquiring a second image which is a second room image captured by the user;

a function of selecting a third image which is an image in which the preference of the user is reflected, from a registered image group or an image group owned by the user, based on the acquired second image and the generated information which indicates the relationship; and a function of suggesting, as an image corresponding to an image print for decorating the second room of the user, the selected third image to the user, wherein the function of generating information is performed by a generation unit that includes a convolution neural network, a loss value calculation unit, and a parameter control unit, the convolution neural network includes an input layer, an intermediate layer, and an output layer, a fourth image, which is an image of the first room decorated with the first image, is input to the input layer, the intermediate layer includes a plurality of sets each including a convolution layer and a pooling layer, acquires a feature map, and outputs the acquired feature map to the output layer, the loss value calculation unit acquires the feature map that is output from the output layer of the convolution neural network and the first image, and calculates a loss value between the feature map and the first image, the parameter control unit adjusts the weight parameter of the convolution neural network based on the loss value calculated by the loss value calculation unit, and the generation unit acquires the weight parameter of the convolution neural network as the room-and-image relationship information.

* * * * *